United States Patent [19]
Rubi

[11] 3,850,385
[45] Nov. 26, 1974

[54] CASSETTE TYPE TAPE RECORDER

[75] Inventor: Horst Rubi, Himmelsthur, Germany

[73] Assignee: Blaupunkt-Werke GmbH, Hildesheim, Germany

[22] Filed: July 14, 1972

[21] Appl. No.: 271,681

[30] Foreign Application Priority Data

July 17, 1971 Germany .......................... 2135886

[52] U.S. Cl. ............................................ 242/198
[51] Int. Cl.. G11b 15/24, G11b 15/29, G11b 15/10
[58] Field of Search .................... 274/4 C, 4 D, 4 E; 242/198; 179/100.22

[56] References Cited

UNITED STATES PATENTS

| | | | |
|---|---|---|---|
| 3,385,534 | 5/1968 | Staar | 274/4 E |
| 3,494,572 | 2/1970 | Uemura | 274/4 E |
| 3,620,479 | 11/1971 | Umeda | 274/4 C |

*Primary Examiner*—Louis R. Prince
*Assistant Examiner*—A. J. Mirabito
*Attorney, Agent, or Firm*—Flynn & Frishauf

[57] ABSTRACT

To permit push-in loading of cassettes into a tape recorder, a carrier plate is provided to carry the drive mechanism for the tape, the carrier plate being guided in a vertical path by pins which engage the cassette when the cassette is fully inserted. During insertion movement, the cassette pushes against an operating lever which deflects a two-arm setting lever which is spring-loaded over a toggle spring. As the cassette pushes against the setting lever, the setting lever is pivoted and carries with it for a short distance the carrier bar; as the over-center position of the spring is reached, the carrier bar snaps in place to lock the cassette and provide driving engagement therefor. For removal, a re-set lever is released to permit the spring to carry the operating mechanism back to its rest position, release the cassette and eject the cassette by spring pressure.

16 Claims, 4 Drawing Figures

CASSETTE TYPE TAPE RECORDER

The present invention relates to a cassette-loaded magnetic tape recorder and more particularly to a tape recorder for use in automotive installations, in which a cassette can be loaded by merely pushing the cassette into a slot.

Cassette-type tape recorders for use in automotive vehicles require extreme simplicity for loading the cassette. The cassette must be insertable in a one-hand operation, in motions which are so simple that the attention of the driver is not distracted from traffic. Additionally, the mechanism must be small and light-weight, yet rugged and essentially immune to shock and vibration.

Customarily used cassette tape recorders utilize a fixed guide into which the cassette is inserted, the cassette being arrested in operating condition by rollers, guide pins or the like. A carrier bar, or carrier plate which carries the operating mechanism for the tape is pivoted about a pivoting point so that, when the cassette is completely inserted, the tape therein can be operated. This requires a pivoting radius of fair size in order to prevent mis-alignment and jamming of the operating mechanism in the cassette itself by cassettes which are not in exactly aligned position. This pivoting radius then results in a comparatively long apparatus which is difficult to locate beneath or within the dashboard of an automotive vehicle since there is insufficient room between the dashboard and the fire wall thereof.

Another type of cassette tape recorder has been proposed in which the relatively large radius of movement of the apparatus itself is avoided. The cassette is inserted into a fixed cassette guide track, the cassette engaging a mechanism which lifts the operating plate carrying the drive mechanism for the cassette itself. The plate is lifted by means of a parallelogram arrangement, located on both sides of the cassette, and lifted from below (with respect to the cassette). This apparatus can be constructed to smaller dimensions and can be used in some automotive type cassette recorders having relatively large unobstructed room beneath the dashboard. The space available beneath the dashboard in automotive vehicles becomes less and less however and thus it is an object of the present invention to provide a cassette recorder which has an operating mechanism that can be located in a minimum amount of space and which avoids tilting or swinging movement of the drive mechanism for the cassette itself during insertion thereof, yet permits one-hand operation which is simple.

SUBJECT MATTER OF THE PRESENT INVENTION

Briefly, a carrier is provided carrying the cassette operating mechanism, the carrier being movable in a path transverse to the insertion movement, or the major plane of the cassette, and being guided in this path, for example by guide pins or the like. The cassette is locked in place by movement of the carrier when the cassette is in operating position.

Moving the carrier for the operating mechanism in a vertical path, that is, transverse to the major plane of the cassette permits construction of the apparatus in a minimum space which can easily be combined with an automotive-type radio receiver. Insertion of the cassette into the receiver likewise can be utilized to trigger the ON switch (and, if desired, transfer from radio reception) so that further operation of controls can be eliminated.

The invention will be described by way of example with reference to the accompanying drawings, wherein.

Figure 4:
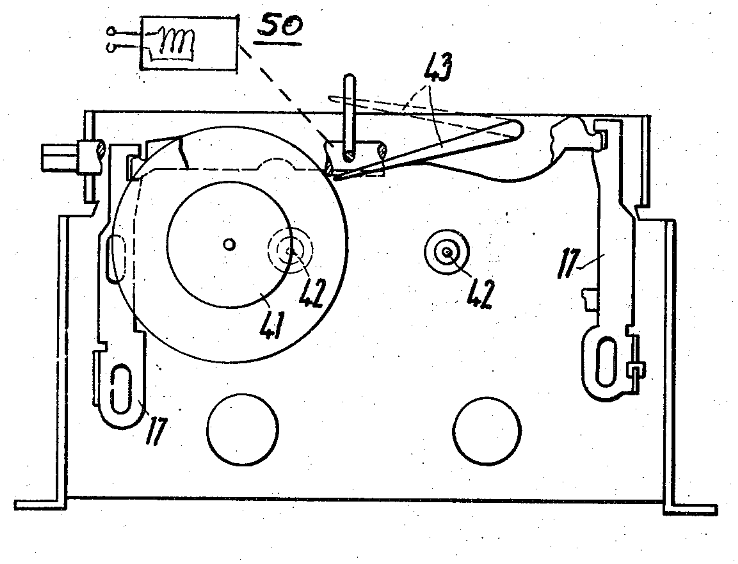

and FIG. 4 is a schematic top plan view omitting unnecessary parts.

Figure 2:
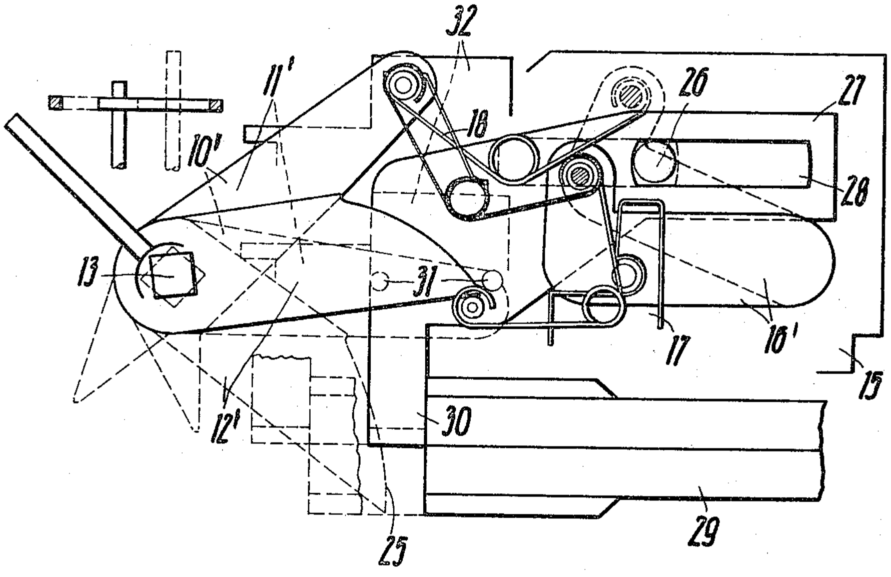
FIG. 2 is a schematic side view illustrating in full lines an actual device operating in accordance with the principle of FIG. 1, and in broken lines the position of the operating arms when the cassette is inserted.
Figure 1:
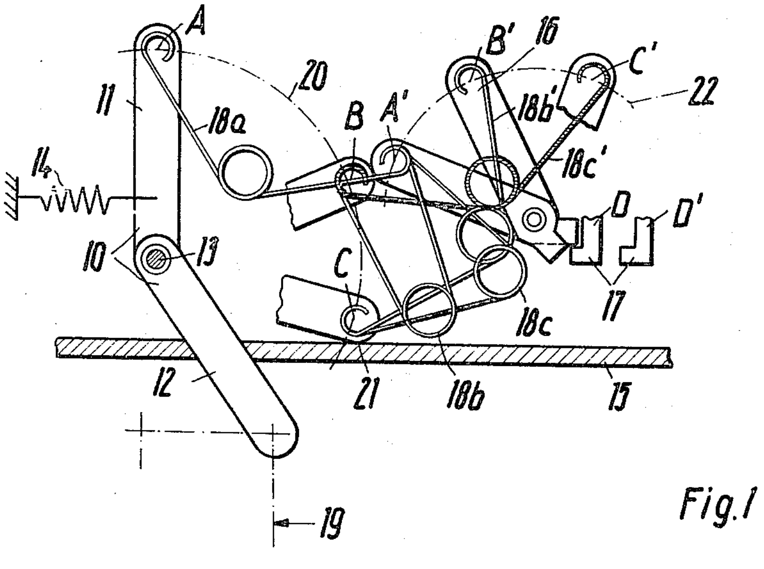
FIG. 1 is a schematic illustration showing the principle of the operation of the mechanism.
Figure 3:
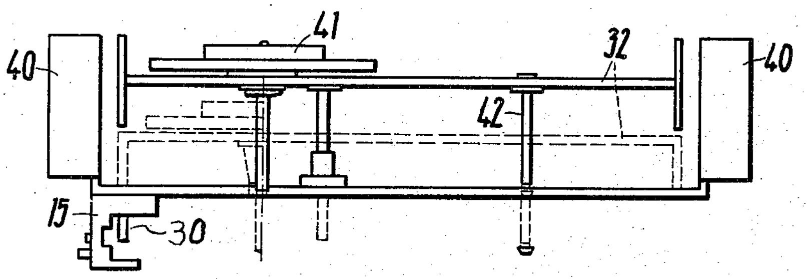
FIG. 3 is a front end view, highly schematic, of the apparatus showing, in full lines, the position of the operating mechanism without a cassette inserted, and in broken lines the position when a cassette has been inserted (omitting, however, the cassette from the drawing)

FIGS. 3 and 4 are drawn to the same scale but FIGS. 1 and 2 are drawn to individually different scales.

The principle of the mechanism of the present invention, and the operation, will be best explained in connection with FIG. 1. A setting lever 10 is pivotally secured in the housing, to rock about a shaft 13. Setting lever 10 has a switching arm 11 and an operating arm 12. A re-set spring 14 engages the switching arm 11 close to pivot axis 13, and maintaining the entire lever 10 in the rest position, illustrated as position A. The cassette is guided in a horizontal insertion path by a cassette guide plate 15. Operating arm 12 extends into the guide path for the cassette, so as to be engaged by the cassette upon inserting movement. A re-set lever 16 is pivotally located in the apparatus and maintained in quiescent position A by a stop lever 17. A spring 18, acting as a toggle spring interconnects the terminal ends of switching arm 11 of the setting lever 10 and the re-set lever 16.

Operation: If a cassette is moved in an inserting path, schematically illustrated by arrow 19, then the cassette will engage the operating arm 12 of setting lever 10, to pivot the setting lever 10 so that the end of the switching arm 11 will deflect over an arch indicated by chain-dotted curve 20. Spring 18 is stressed. Movement in the direction of arrow 19 will stress the spring 18 which is shown at **18*a* when the setting lever 10 is in the A position. As the setting lever 10 is deflected due to movement of the cassette in direction of arrow 19, the switching arm 11 will reach position B, which is over-center position of the spring 18, as seen in the position 18*b*. This is the operating position for the cassette. Due to the toggle action of the spring, the spring will press the switching arm 11 of the setting lever downwardly, until the setting lever is engaged by a stop 21, which may, for example, be the top of the cassette guide 15. As soon as switching arm 11 has reached stop 21, the operating point C of the tape recorder apparatus has been reached and a carrier bar, carrying the drive mechanism for the cassette (not shown in FIG. 1) has been moved vertically, so that the drive elements of the drive mechanism have engaged the cassette. The drive mechanism of the apparatus is moved downwardly as the setting lever moves from the over-center point B to the operating point C, this motion being effected by the spring 18. The stop lever 17 retains the re-set lever 16** in position as indicated at A' during the inserting movement of the cassette.

When the cassette recorder is turned off, or the cassette is to be removed, then locking lever 17 is moved from the locked position to the position D'. This unlatches the re-set lever 16. The spring moves from position 18$c$ to the position 18$b'$, moving the re-set lever 16 into the position B'. This, simultaneously, lifts the setting lever 10, so that arm 12 moves from the position C to the position B, lifting the carrier, and with it the locking device for the cassette and the transport mechanism away from the cassette. The re-set lever continues to travel to the position indicated at C'. The setting lever 10 is returned to its original position by spring 14, which pulls re-set lever 16, over spring 18, back to the position A', to be again engaged by the stop lever 17. The cassette itself is pushed out of the way by the movement of the switching arm 12 which is pushed in a direction counter the arrow 19 and, due to the spring 14, the cassette is pushed outwardly from the set and ejected, after having been released from engagement with the drive mechanism to drive the tape of the cassette, which has been lifted out of the way after the switching arm 12 has passed the position B.

The entire operation, and particularly the various positions of the various levers can be visualized from table I:

TABLE I

| | Cassette Insertion Base Position (A) | Dead Center Position (B) | Operating Position (C) |
|---|---|---|---|
| Setting lever 10 | A | B | C |
| Spring 18 | 18$a$ | 18$b$ | 18$c$ |
| Re-set lever 16 | A' | A' | A' |
| Stop lever 17 | D | D | D |

TABLE II

| | Cassette Ejection Operating Position (C) | Dead Center Position (B) | Base Position (A) |
|---|---|---|---|
| Setting lever 10 | C | B | A |
| Spring 18 | 18$b'$ | 18$c'$ | 18$a'$ |
| Re-set lever 16 | B' | C' | A' |
| Stop lever | D' | D' | D |

An actual constructional example is shown in FIG. 2, in which a setting lever 10' and a re-set lever 16' are interconnected by spring 18. Setting lever 10' is journalled on a shaft 13 and has a switching arm 11' and an operating arm 12'; the operating arm 12' has a curved camming surface 25 at its forward edge. A slider 27, with a notch 28 therein, is slidable back and forth with respect to a bolt 26. Slider 27 has a depending projection 30 adapted to be engaged by a cassette 29 moved in a horizontal path from right to left during insertion (with respect to FIG. 2). Projection 30 extends below the cassette guide plate 15. Slider 27 further has a pin 31 which acts as a cam operating element and engages the camming surface 25 on the operating arm 12' of the setting lever 10'. The drive elements for the cassette are carried by a support member, in form of a plate element 32; the drive elements themselves have been omitted from FIG. 2 for purposes of clarity. The support 32 itself can be a shaped element and, generally, is preferably plate-like. Carrier 32 is coupled to the entire movable apparatus. The operation of the apparatus is similar to that explained in detail in connection with FIG. 1. For better illustration, the rest position, prior to insertion, of the various elements is drawn in full lines, and the position of the elements after a cassette has been inserted is drawn in broken lines. Upon insertion of a cassette 29 into the cassette guide plate 15, the cassette 29 will engage projection 30 and move slider 27 in parallel to the cassette guide path. Pin 31 will slide on the camming surface 25 and setting lever 10 will be deflected from its base position, the re-set lever 16 being held in position by the stop lever 17. When the cassette 29 has reached operating position, the spring 18 is just at its dead center position and will snap over to move the setting lever 10 into the position shown in broken lines, moving the carrier 32 into the broken line position and into engagement with cassette 29. When the stop lever 17, which is preferably in form of a slider is moved to the right, the re-set lever is unlocked and the levers returned, as previously described, back to their original base position. Spring 14 has not been shown, for clarity, and may, for example, be a spiral spring concentric with shaft 13. In one form, and as illustrated in the drawing, shaft 13 has a square end profile, to be engaged by the setting lever 10', the shaft 13 itself being biassed by a spring, comparable in operation to spring 14, into the full line position.

FIGS. 3 and 4 illustrate the relative size of the apparatus with respect to a cassette, the original drawing illustration being to a scale of 1 : 1. The various operating elements as discussed in detail in connection with FIGS. 1 and 2 have been illustrated only schematically, and the elements of the drive network have also been illustrated schematically.

A pair of operating mechanisms, as illustrated in FIG. 2, for example, are located on either side of the apparatus. The cassette insertion plate 15 has a notch in front, to guide the cassette, depending on the cassette shape. Carrier bar 32 is shown raised, that is, prior to insertion of a cassette. Upon insertion of a cassette it will be lowered to the broken line position. Carrier bar 32 is formed with cylindrical pins 42 which slide in suitable bushings on the support and guide plate 15. The drive for the tape in the cassette is schematically indicated by pulleys 41. Pins 42 not only are the guides for vertical movement of the carrier 32, but further act as stops and locking devices for the cassettes to secure an inserted cassette in operating condition.

FIG. 4 illustrates the shape and the position of the stop lever 17. Stop lever 17, itself, can be operated by manually or automatically operable lever 43. Preferably, lever 43 is engaged by a rotary element which is connected to a coil, to be rotated when the coil 50 is de-energized. Coil 50 is preferably connected to the power supply for the cassette recorder. Should the power to the cassette recorder be dis-connected, or fail, then the stop lever 17 is automatically unlatched, thus causing any cassette which might be inserted in the recorder to be released and ejected. This avoids flat spots on the drive mechanism for the cassette and retention of the cassette in a disconnected recorder.

Relative sizes of the entire apparatus can best be visualized by the following illustrative example:

| | |
|---|---|
| width | 11.8 cm |
| depth | 6.9 cm |
| height | 4 cm. |

Various changes and modifications may be made within the inventive concept.

I claim:

1. Cassette loaded tape recorder comprising
a guide holder (15) for a cassette (29) adapted to locate the cassette in the recorder and to guide the cassette in a linear path during broadside insertion thereof and during removal thereof from the recorder by a broadside motion of the cassette;
carrier means (32) adapted to carry the drive mechanism (41) for the tape in the cassette, said carrier being movable between driving engagement position with the cassette and a released position;
carrier operating means (FIG. 1; FIG. 2; FIGS. 3,4,40) adapted to be engaged by a surface of the cassette (29) during its insertion in said path and linked to said carrier means (32) to effect movement thereof into cassette engaged position only after the cassette has substantially reached its operating position, said carrier operating means comprising an over-center spring means (18) connected to the carrier means (32), the carrier operating means including a projection (30) adapted to be engaged by the cassette (29) and connected to said spring means (18) to move the spring means upon engagement of the cassette and projection until the dead center position of the spring means is reached and the spring means then moves the carrier means (32), and with it the cassette locking means (42) into cassette engaged position without substantial further motion of the cassette;
carrier guide means (42) guiding movement of the carrier means (32) upon movement of the carrier means after complete insertion of the cassette in a direction transverse to the guide path;
and cassette locking means (42), movable with said carrier means and locking the cassette in position upon movement of the carrier means into cassette engaged position.

2. Recorder according to claim 1, further comprising movable re-set means (16) releasing the carrier means and the cassette locking means (42) from cassette engaged position, said re-set means comprising
a lever (16) connected to said over-center spring (18) and movable to move the over-center spring in over-center direction and past the over-center position (B) counter the direction of movement of the spring imparted by the carrier means (32), to lift the carrier means (32) transversely to the insertion path of the cassette.

3. Cassette loaded tape recorder comprising
a guide holder (15) for a cassette (29) adapted to locate the cassette in the recorder and to guide the cassette in a linear path during broadside insertion thereof and during removal thereof from the recorder by a broadside motion of the cassette;
carrier means (32) adapted to carry the drive mechanism (41) for the tape in the cassette, said carrier being movable between driving engagement position with the cassette and a released position;
carrier operating means (FIG. 1; FIG. 2; FIGS. 3,4: 40) comprising spring means (10, 18) loaded by movement of the cassette (29) during its insertion in said path and linked to said carrier means (32) to effect movement of said carrier means into said driving engagement position by partial unloading of said spring means only after the cassette has substantially reached its operating position;
carrier guide means (42) guiding movement of the carrier means (32) during movement of the carrier means after complete insertion of the cassette in a plane direction transverse to the guide path;
cassette locking means (42), movable with said carrier means and locking the cassette in position upon movement of the carrier means into cassette engaged position movable re-set means (16) for releasing the carrier means and the cassette locking means (42) from the cassette engaged position and thereby allowing further unloading of said spring means (18) of the carrier operating means to move said carrier means out of cassette engagement position into its released position and to urge a slider (17) forming part of the carrier operating to at least partially eject the cassette from said guide holder.

4. Cassette loaded tape recorder comprising
a guide holder (15) for a cassette (29) adapted to locate the cassette in the recorder and to guide the cassette in a linear path during broadside insertion thereof and during removal thereof from the recorder by a broadside motion of the cassette;
carrier means (32) adapted to carry the drive mechanism (41) for the tape in the cassette, said carrier being movable between driving engagement position with the cassette and a released position;
carrier operating means (FIG. 1; FIG. 2; FIGS. 3,4:40) adapted to be engaged by a surface of the cassette (29) during its insertion in said path and linked to said carrier means (32) to effect movement thereof into cassette engaged position only after the cassette has substantially reached its operating position, said carrier operating means comprising:
a setting lever (10) and a re-set lever (16),
the setting lever (10) having a switching arm (11) and an operating arm (12), a toggle spring (18) interconnecting the re-set lever (16) and the setting lever;
the operating arm (12) being adapted to be moved during inserting movement of the cassette and thereby moving the switching arm (11) to stress the spring (18) until the toggle spring reaches dead center position (E) and moves the switching arm (11), and with it the carrier means (32) into cassette engaged position, at least one of said arms supporting the carrier means (32) in said recorder;
carrier guide means (42) guiding movement of the carrier means (32) upon movement of the carrier means after complete insertion of the cassette, in a direction transverse to the guide path;
and cassette locking means (42), movable with said carrier means and locking the cassette in position upon movement of the carrier means into cassette engaged position.

5. Recorder according to claim 4, wherein the operating arm (12) of the setting lever (10) extends into interfering position in said cassette insertion path and being adapted to be engaged by the cassette during inserting movement thereof.

6. Recorder according to claim 4, wherein said setting lever (10) is pivotable and means (14) are provided biassing the setting lever (10) into dis-engaged position.

7. Recorder according to claim 4, including means (13) securing the setting lever (10) in the recorder for rocking movement, the axis of the rocking movement being transverse to the insertion path of the cassette.

8. Recorder according to claim 7, wherein the switching arm (11) and the operating arm (12) of the setting lever include an angle of less than 180°, and the carrier (32) is connected to said switching arm (11).

9. Recorder according to claim 4, wherein the operating arm (12) of the setting lever (10) is formed with a camming surface (25);

and cam operating means (47, 30, 31) are provided movable in said insertion path and adapted to be engaged by the cassette and transferring cassette movement to the camming surface to move said operating arm upon insertion of the cassette.

10. Recorder according to claim 9, wherein said cam operating means comprises a slider (27) and means (26, 28) guiding the slider in a path parallel to said insertion path, the slider (27) being formed with a projection (30) extending into said insertion path.

11. Recorder according to claim 4, including stop means (21) limiting movement of the setting lever (10) after the toggle spring (18) has passed its over-center position (B) to position the carrier means (32) with respect to the cassette (29).

12. Recorder according to claim 4, wherein said reset lever (16) is connected to said over-center spring means (18) and movable to move the over-center spring means in over-center direction and past the over-center position (B) counter the direction of movement of the spring means imparted to the spring means (18) upon movement of the switching arm (12);

and means (17) are provided securing the switching arm against movement during inserting movement of the cassette and after the toggle spring (18) has passed its over-center position (B) to restrain movement of the re-set lever (16) and hence prevent return of the toggle spring, to hold the toggle spring in stressed condition.

13. Recorder according to claim 12, wherein cassette engagement means (30, 27; 12) are provided in operative connection with said switching lever (10) and adapted to be engaged by the cassette (29) during insertion thereof in the recorder, the spring means (18), during return movement thereof moving said switching lever (10) and hence said cassette engagement means (30, 27; 12) to eject the cassette from the recorder.

14. Recorder according to claim 12, wherein the reset lever (16) is L-shaped and the securing means comprises a slider (17).

15. Recorder according to claim 12, further comprising electromagnetic means (50) releasing said re-set lever upon failure of power supply to said recorder.

16. Recorder according to claim 15, wherein the electromagnetic means (50) comprises a solenoid acting on said re-set lever (16).

* * * * *